United States Patent [19]
Minde et al.

[11] Patent Number: 6,157,830
[45] Date of Patent: *Dec. 5, 2000

[54] SPEECH QUALITY MEASUREMENT IN MOBILE TELECOMMUNICATION NETWORKS BASED ON RADIO LINK PARAMETERS

[75] Inventors: Tor Björn Minde, Gammelstad; Anders Tomas Uvliden, Luleå ; Per Anders Karlsson, Luleå ; Per Gunnar Heikkilä, Luleå , all of Sweden

[73] Assignee: Telefonaktiebolaget LM Ericsson, Stockholm, Sweden

[ * ] Notice: This patent is subject to a terminal disclaimer.

[21] Appl. No.: 08/861,563

[22] Filed: May 22, 1997

[51] Int. Cl.⁷ .............................. H04Q 7/20; H04B 17/00; G10L 15/00

[52] U.S. Cl. ...................... 455/424; 455/67.5; 455/67.3; 455/226.1; 704/216; 704/237

[58] Field of Search ...................... 455/423, 424, 455/425, 67.3, 226.1, 226.3, 67.5; 704/237, 216

[56] References Cited

U.S. PATENT DOCUMENTS

| | | | |
|---|---|---|---|
| 4,860,360 | 8/1989 | Boggs | 704/233 |
| 5,023,900 | 6/1991 | Tayloe et al. | 455/424 |
| 5,095,500 | 3/1992 | Tayloe et al. | 455/424 |
| 5,214,687 | 5/1993 | Känsäkoeski | 455/425 |
| 5,386,495 | 1/1995 | Wong et al. | 455/67.3 |
| 5,432,778 | 7/1995 | Minde et al. | 375/343 |
| 5,481,588 | 1/1996 | Ricki et al. | 455/423 |
| 5,490,288 | 2/1996 | Wiatrowski | 455/423 |
| 5,526,366 | 6/1996 | Jarvinen et al. | 714/747 |
| 5,557,639 | 9/1996 | Heikkila et al. | 375/224 |
| 5,598,431 | 1/1997 | Lobel | 455/226.1 |
| 5,630,210 | 5/1997 | Marry et al. | 455/67.3 |
| 5,721,754 | 2/1998 | Chen | 455/67.3 |
| 5,848,384 | 12/1998 | Hollier et al. | 704/233 |
| 6,021,385 | 2/2000 | Järvinen et al. | 704/219 |

FOREIGN PATENT DOCUMENTS

| | | | |
|---|---|---|---|
| 0 664 536 | 7/1995 | European Pat. Off. | G10L 5/06 |
| 0 720 407 A2 | 7/1996 | European Pat. Off. | H04Q 7/38 |
| 720407 | 7/1996 | European Pat. Off. | |
| 4324292 | 2/1995 | Germany | H04B 17/00 |
| 2 227 885 | 8/1996 | United Kingdom | H04Q 7/38 |
| 2297885 | 8/1996 | United Kingdom | |
| 96/06496 | 2/1996 | WIPO | H04M 3/22 |
| 96/09704 | 3/1996 | WIPO | H04L 1/20 |
| 96/28950 | 9/1996 | WIPO | H04R 29/00 |

OTHER PUBLICATIONS

European Patent Office Standard Search Report RS 99560, Jan. 1998.

European Standard Search Report re RS 99560 Date of completion of search: Jan. 26, 1998.

*Primary Examiner*—Edward F. Urban
*Assistant Examiner*—Rafael Perez-Gutierrez
*Attorney, Agent, or Firm*—Burns, Doane, Swecker & Mathis, L.L.P.

[57] ABSTRACT

A method and system for measuring the speech quality in a mobile cellular telecommunications network using available radio link parameters is disclosed herein. In a preferred embodiment, the method includes receiving a set of radio link parameters, as defined in a standard or otherwise available, such as the BER, FER, RxLev, handover statistics, soft information, and speech energy. Temporal information is obtained from the radio link parameters to create a set of temporal parameters which can be statistically analyzed, for example, for the maximum and minimum, mean, standard deviation, and autocorrelation values for a time interval. The temporal parameters are combined to yield a set of correlated parameters that are more closely related to the speech quality. An estimator then uses the correlated parameters to calculate an estimate for the speech quality. The method of the present invention takes advantage of temporal information and correlated relationships from the transmitted parameters. Furthermore, the method is inherently simple and reliable as compared to prior art methods. Still further, the technique provides a method that allows operators to monitor quality conditions throughout the network.

25 Claims, 3 Drawing Sheets

SPEECH QUALITY MEASUREMENT IN MOBILE TELECOMMUNICATION NETWORKS BASED ON RADIO LINK PARAMETERS

FIELD OF INVENTION

The present invention relates generally to speech quality measurement in wireless telecommunication systems, and pertains more specifically to a method of measuring the speech quality using radio link parameters.

BACKGROUND OF THE INVENTION

In the Wireless telecommunications industry, cellular service providers are intensely interested in providing high quality, reliable services for their customers in today's highly competitive environment. For example, reliability problems such as dropped calls and quality issues such as fading, multi-path interference, and co-channel interference are concerns constantly facing cellular operators. Another issue of great interest to operators is the improvement of perceived speech quality by the end user within the cellular system. Therefore, it is desirable for operators to be able to determine which areas in the network are experiencing quality problems.

There have been a number of methods used in the past to measure speech quality in cellular networks. One commonly used method involves testing a cellular network by transmitting known signals and comparing the received signals to a predefined signal database to determine an estimate for the quality. The term signal is used herein to refer to sounds perceptible in the human audio frequency range which include speech and tones. This method is illustrated in FIG. 1. Depicted is a known signal database 2, wherein predetermined signals are sent through a system under test 4. The system under test 4 represents all the functioning components of a cellular network which includes a mobile switching center (MSC), a radio base station (RBS), all communication links, and the air interface. Once the transmitted signals have been received, a second signal database 6 containing the original signal patterns are compared to the received signals at step 8. An estimate is then calculated for the quality of the received signal for the network.

In digital systems, the conversion of analog speech signals to digital signals requires much more bandwidth for transmission than is desirable. Bandwidth constraints in wireless telecommunication systems have spawned the need for low bit-rate speech coders which work by reducing the number of bits that are necessary to transmit while preserving quality and intelligibility. In general, it is desirable to transmit at lower bit-rates but quality tends to diminish with decreasing bit rates. The speech coders used in these applications work by encoding speech while removing redundancies embedded during speech production.

Typically, speech coders obtain their low bit-rates by modeling human speech production in order to obtain a more efficient representation of the speech signal. The original speech signal can be synthesized using various estimated filter parameters. Since many of the prior art testing methods include the use of audio tones in the testing procedure, they do not lend themselves well for testing with digital systems. This is because, speech coders are modeled after speech production and are not optimized for tones, thus errors in tone regeneration may likely be encountered.

Another source of potential problems with the method of FIG. 1 when utilizing speech signals is in the compare and estimate step 8. Speech database 2 contains a limited number of repeating predetermined sentences (e.g. 6–8 sentences) that are representative of speech patterns typically made through a mobile network. The estimate portion in step 8 employs perceptual models that mimic the listening process. Models; of this type are typically very complicated and difficult to formulate. This leads to differences between the model and the subjective assessment thereby leading to sometimes unreliable measurements.

A predominant factor affecting speech quality in digital systems is the bit error rate (BER). Bit errors tend to be introduced during transmission over the air interface. The BER is the, frequency at which these bit errors are introduced into the transmitted frames. High BER situations often occur during conditions of high co-channel interference, weak signals such as mobile roaming out of range, and fading caused by multi-path interference due to obstructions such as buildings etc. Although attempts are made at correcting these errors, an excessively high BER has a detrimental effect on speech quality.

In a Global System for Mobile Communication (GSM) network for example, the BER and other related parameters, such as Receive Quality (RxQual) and Receive Level (RxLev), are monitored to assess speech quality. There are shortcomings in using this method since correlation relationships and temporal information that can be obtained from the parameters are not taken advantage of to obtain parameters that are more closely related to the speech quality. For example, the extraction of temporal information permits the formulation of a host of relationships between the variables that can be taken advantage of for measuring speech quality. It is known that the perceived speech quality for the end user is associated with time averaging over a length of a sentence at its highest resolution. The final quality is averaged over the whole conversation meaning that the lowest resolution is approximately in the range of several minutes. Therefore the use of derived temporal and correlated parameters, which is lacking in GSM, will give clearer insight as to the state of speech quality experienced for many situations.

The RxQual parameter in the GSM system is measured every 0.5 seconds and is inherently dependent on the BER for each 20 millisecond frame. Further, RxQual can fluctuate widely due to fading, noise or interference which can lead to quality measurements that fluctuate much faster than the perceived speech quality. One seemingly obvious solution would be to increase the temporal resolution with a time constant in the area of 2–5 seconds. But it has been found that the relationship between the digital communication link and speech quality is not solely dependent on a time averaged BER.

What is needed is a method that is both simpler and more accurate than using signal databases and takes advantage of correlation relationships and temporal information from radio link parameters. A further objective is to provide an effective method, using available parameters, that allows operators to monitor quality conditions throughout the network.

SUMMARY OF THE INVENTION

To achieve the foregoing and other objectives in accordance with the present invention, a method and arrangement for measuring the speech quality in a mobile communications network is disclosed herein. In a preferred embodiment, the method includes receiving a set of radio link parameters, as defined in a standard or otherwise available, such as the BER, FER (Frame Erasure Rate), RxLev, handover statistics, and soft information. The radio link parameters are processed to retrieve applicable temporal information which are used to calculate a set of temporal parameters. The temporal processing also includes, if necessary, transforming the radio link parameters in the time domain to obtain more tractable shapes. The transformed data can then be statistically analyzed, for example, for the maximum and minimum, mean, standard deviation, and autocorrelation values for any prior time interval. The newly calculated temporal parameters and radio link parameters are then correlated to yield a set of correlated parameters that are more closely related to the speech quality. An estimator using the correlated parameters, then calculates an estimate for the speech quality.

In an apparatus aspect of the present invention, a functional apparatus, for measuring the speech quality in a cellular telecommunication network is described. The apparatus is comprised of three functional stages wherein the first stage, a temporal processing stage, is arranged to receive a set of radio link parameters contained in a frame of data transmitted from a mobile station. The temporal processor calculates a set of temporal parameters to be entered into the correlation processing state. The correlation processing correlates the temporal parameters to derive relationships between the parameters that are more closely related to speech quality. The correlated parameters are then entered into an estimator stage to calculate an estimate of the speech quality. The estimator may be based on a linear or non-linear estimation. Furthermore, the estimator may be comprised of a neural network, or a state machine configured to change state in response to a change in a dynamic variable such as the speed of a moving mobile station or a change from frequency hopping to non-frequency hopping.

The present invention using radio link parameters provides an inherently simple and reliable method of measuring the speech quality in a cellular network. Furthermore, the dynamic nature of the technique allows the operator to be constantly updated on the quality conditions in all parts of the network. These and other advantages of the present invention will become apparent upon reading the following detailed descriptions and studying the various figures of the drawings.

BRIEF DESCRIPTION OF THE DRAWINGS

The invention, together with further objectives and advantages thereof, may best be understood by reference to the following description taken in conjunction with the accompanying drawings in which.

DETAILED DESCRIPTION OF THE PREFERRED EMBODIMENTS

Figure 1:
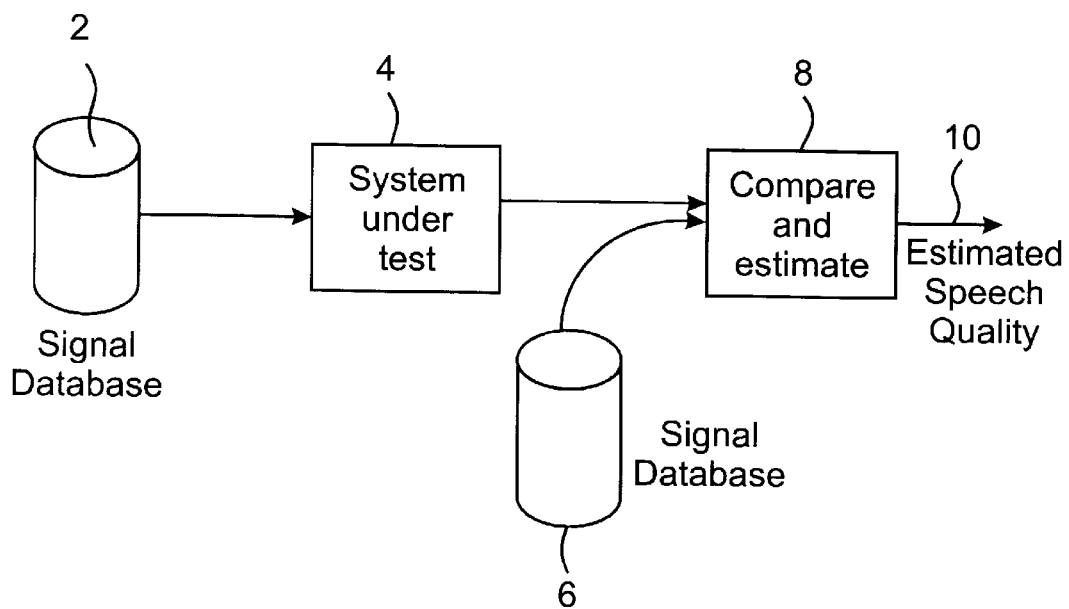
FIG. 1 shows a prior art method of measuring speech quality using signal databases.

A discussion of FIG. 1 directed toward a prior art method of speech quality measurement was provided in the preceding sections. In a basic cellular system, a mobile switching center (MSC) is linked to a plurality of base stations (BS) that are geographically dispersed to form the area of cellular coverage for the system. Each of the base station are designated to cover a specified area, known as a cells, in which two way radio communication can then take place between a mobile station MS and the BS in the associated cell. The quality level of coverage is not uniform for all points in the coverage area because of various uncontrollable factors. Therefore the perceived quality by the end user provides important information about the current performance level of the network. A description of a method for measuring speech quality in the network by monitoring radio link parameters follows.

Figure 2:
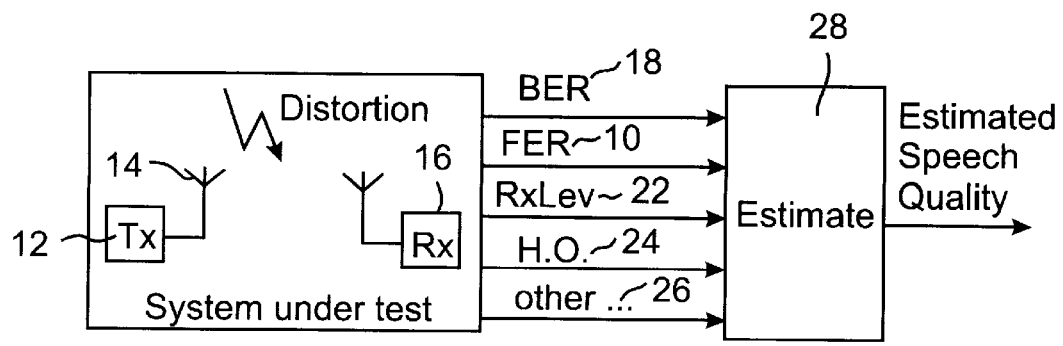
FIG. 2 shows a method of measuring speech quality in a mobile communications network in accordance to an embodiment of the present invention.

FIG. 2 illustrates the basic concept of utilizing radio link parameters, that are available in e.g. an MS, BS, and MSC for a typical TDMA based network. By way of example, a transmitter 12 from an associated base station transmits a signal from an antenna 14 through the air in the form of bursts of digitally modulated information (digital packets). In an ideal situation, the transmitted signal would be received in its original form without any errors by a receiver 16 in the MS. In practice, distortion caused by weak signals (shadowing), multi-path fading, and co-channel interference all can introduce errors into the transmission.

In systems operating in accordance with D-AMPS, for example, voice and other data are sent in 20 millisecond digital packets, referred to as frames, which are further divided into six time slots. In a downlink situation, coded speech data is transmitted to an MS using two time slots in each frame and is decoded in a speech decoder in the MS. As the frames are transmitted, bit errors introduced by distortions on the bit-stream are received and detected by the MS and a bit error rate (BER) 18 is calculated. A frame containing the data may be marked as "bad" when the number of bit errors is above a specified threshold or when checksum errors are detected. The rate of occurrence of "bad" designates a frame erasure rate (FER) which is reported as parameter 20. A "bad" frame, containing necessary control information and data, is not reliable and therefore cannot be used. In this situation, data from a previous "good" frame is used in an attempt to recover from the bit errors.

Another parameter reported by the MS is the received signal level (RxLev) 22 which reports the signal strength. A handover parameter 24, representing statistics of handover events, is reported and indicates that the call has been switched to another frequency e.g. during an intercell handover situation to another cell. Further, other parameters 26 containing e.g. soft information are obtained from receiver 16. Soft information may contain, for example, information on the quality of the bits in a designated frame. A method of using soft information and for improving quality estimation is disclosed in U.S. Pat. No. 5,432,778 granted to Minde et al. entitled: Method and An Arrangement For Frame Detection Quality Estimation in the Receiver of a Radio Communication System issued on Jul. 11, 1995 which is incorporated by reference herein in its entirety. An estimate of speech quality 28 can then be made from the measured parameters as described below.

In a cellular network, there is a predefined speech communication link, therefore a known speech coder/decoder (codec) conforming to a specified standard is used. The perceived end-quality of the speech is not only affected by the number of bit errors but also on their temporal distribution. For example, a deep fading dip may cause a short burst of errors in the bit-stream, which are in close temporal proximity, and may in turn cause the channel decoder to fail while decoding. This may introduce a frame erasure or may cause an erroneous decoding of speech. Frame erasures can be concealed through the repetition of parameter data bits from previous frames, which may result in a "synthetic" sound due to the regeneration. Furthermore, erroneous speech decoding and synthesis due to the decoding failures may be propagated for a few frames and may result in undesirable loud clicks or bangs. Thus, a short burst of sequential bit errors may cause the quality to degrade significantly for some time. On the other hand, many fast fading dips may introduce a lower average residual BER and result in better perceived speech quality since channel decoding is able to correct most of the errors. Therefore the foregoing suggests that the temporal characteristics of the speech quality-related parameters should be taken into account. These parameters carry information about different properties, for example, fading rates, fading lengths, fading depths, signal-to-noise ratios, signal-to-interference ratios, signal levels and hand-over situations. Therefore it is possible to extract additional information about the perceived quality from the correlations and cross-correlations of these parameters in time.

Figure 3:
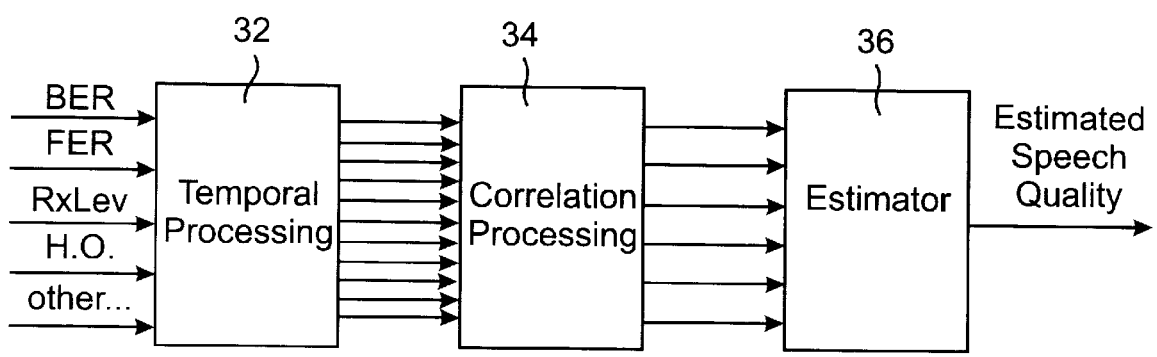
FIG. 3 shows a block diagram of the quality measurement procedure in accordance with an embodiment of the present invention.

Referring now to FIG. 3, a method of speech quality measurement utilizing temporal and correlation processing is depicted in accordance with an embodiment of the present invention. The preferred embodiment comprises a multi-stage configuration that includes a temporal processing stage 32, a correlation processing stage 34, and an estimator stage 36. Radio link parameters such as BER, FER, RxLev, H.O., and soft information are input into the temporal processing stage 32. From these parameters, new parameters can be calculated. As can be appreciated by those skilled in the art, the temporal processing of the parameters can be performed, for example, by applying so-called "sliding windows" or simply "windowing" in the time domain such as e.g. rectangular, exponential, and hamming ($sin^2$ window) to achieve temporal weighting. The parameters can then be correlated by taking, for example, the root, exponential, or log of the function to achieve a more appropriate shape. Moreover, the transformed data can be analyzed with statistical methods which may include determining the maximum value, minimum value, mean value, standard deviation, skewness, kurtosis etc. These processes may be performed independently and in any order to achieve the desired relationships.

Temporal processing in block 32 is desirable to extract temporal information from parameters by examining their previous activity during a specified time interval. By way of example, the examination a sequence history of measurements for a parameter, it is possible to calculate temporal parameters such as mean value for the last X seconds, estimate the standard deviation during Y seconds, or the autocorrelation function during the last Z seconds. In an example, the mean BER during the last 3 seconds or the number of erased frames during last 5 seconds are representatives of new temporal parameters for deriving parameters more closely related to an aspect of speech quality.

Correlation stage in block 34 correlates the original or newly calculated temporal parameters to produce correlated parameters which are more directly related to speech quality. For example, modern cellular systems attempts to conceal the loss of a frame due to bit errors by repeating the previous 20 ms frame with the hope it will not be heard. This means that the number of bit errors in the lost frame are not relevant, since the frame contents never reaches the listener. This suggests that a new parameter which correlates more closely with speech quality may be calculated by correlating the BER with FrameLoss for instance.

In a first example that works well with the present invention and which illustrates the use of temporal and correlation processing, the mean for the BER is calculated over 0.5 second intervals, in temporal processing stage 32 to create a new temporal parameter RXQ_MEAN_5. In correlation stage 34, the RXQ_MEAN_5 parameter is correlated by applying a third power transformation yielding a $(RXQ\_MEAN\_5)^3$ correlated parameter. In a second example, the FER is calculated over 0.5 second intervals to form temporal parameter FER_MEAN_5. A third root transformation is then applied to temporal parameter FER_MEAN_5 to form a correlated parameter $(FER\_MEAN\_5)^{1/3}$. In a third example, the FER is calculated over a 5 second interval to determine the number of consecutive frame erasures to form the parameter FER_BURSTS_5. Subsequent correlation is performed by applying a square root transformation to the temporal parameter to form a correlated parameter $(FER\_BURSTS\_5)^{1/2}$. A summary of the temporal parameters and associated correlated parameters is given below in TABLE A.

TABLE A

| TEMPORAL PARAMETER | CORRELATED PARAMETER |
| --- | --- |
| RXQ_MEAN_5 | $(RXQ\_MEAN\_5)^3$ |
| FER_MEAN_5 | $(FER\_MEAN\_5)^{1/3}$ |
| FER_BURSTS_5 | $(FER\_BURSTS\_5)^{1/2}$ |

Other potential parameters may include performing similar operations to the residual bit error rate (RBER, where the RBER is equal to zero when the frame is erased and equal to the BER when the frame is not erased) and other received parameters. It should be noted that temporal processing and statistical analysis may be performed on the correlated parameters and that some, for example, RBER may be calculated on "raw" data.

Estimator stage in block 36 uses the correlated parameters to calculate an estimate of the perceived speech quality. The estimator 36 can be based on varied mathematical models such as linear, non-linear, or may comprise a neural network. A simple linear model can be of the form:

$$\text{Estimate} = A(\text{Parameter 1}) + B(\text{Parameter 1}) +$$

where coefficients A and B are optimized for the best performance. Coefficients may be derived, for example, by using a linear regression technique on a subjectively graded training material. Although linear estimation provides adequate results, as one skilled in the art can appreciate, non-linear estimators may provide more accurate estimation.

An exemplary procedure using linear estimation can be performed on the correlated parameters of an above example and may take the form:

$$\text{Estimate} = A*(FER\_MEAN\_5)^{1/3} + B*$$

where coefficients A and B can be derived by the aforementioned linear regression techniques which are well known. Moreover, it is possible to combine any number and combination of radio link, temporal, or correlated parameters for the estimation as determined to be optimal for various situations by one skilled in the art. Furthermore, specific examples of temporal and correlated parameters have been provided and thus various modifications to the described parameters may occur to those skilled in the art are viewed to be within the spirit and scope of the present invention. In particular, modifications to relationships regarding the temporal and correlated parameters and variations in interval lengths may be changed to suit the particular type of interference or situation experienced.

Figure 4:
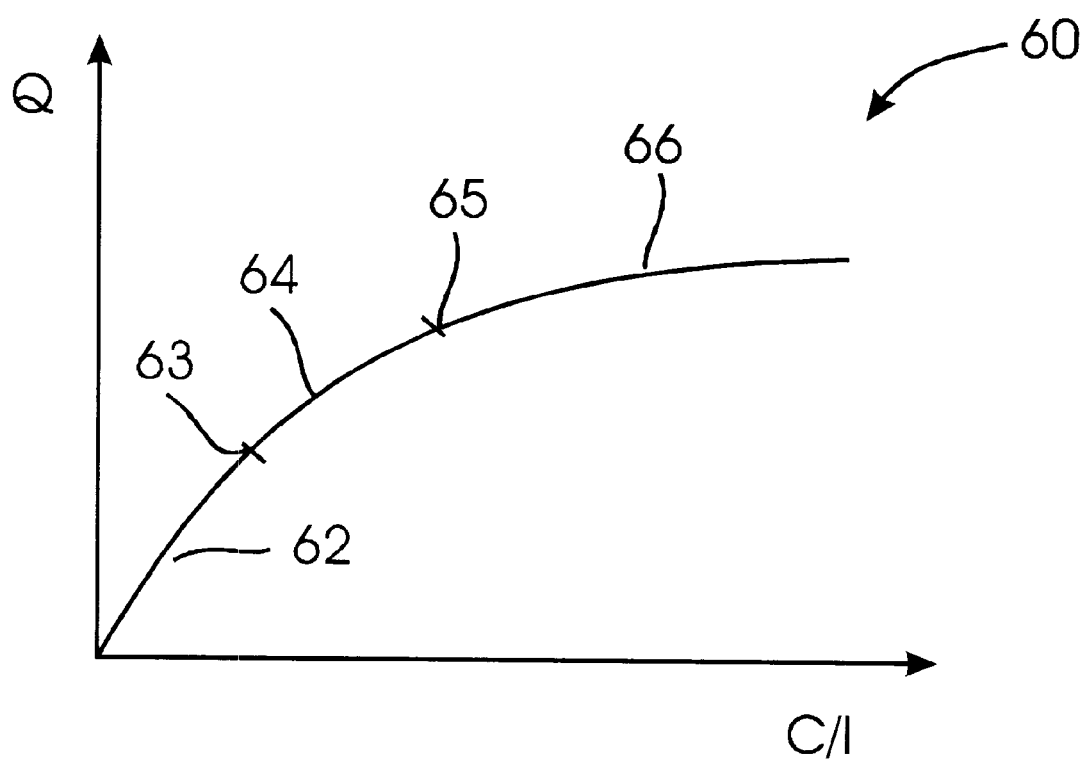
FIG. 4 shows a graph of an exemplary parameter correlated to speech quality.

Non-linear estimation may also be performed by multiple linear estimators which approximate the nearly-linear portions of a modeled curve. FIG. 4 depicts a graph of the relationship of Quality (Q) verses the ratio of carrier to interference (C/I) using this technique. Curve 60 may be divided into several near-linear segments to be modeled with the successive linear estimators. For example, segment 62 is steeply inclined having, little curvature and thus may be represented by a linear model. Similarly, segment 64 has a bit more curvature and may also be approximated by a linear model. Segment 66 of the curve starts to level out and can be approximated quite well with a linear model. In order to provide seamless transition between the models, it becomes necessary to determine where the current operating point is. A method that can be employed to solve this is to use a model to determine the probability of being in a specific segment. The linear models used in the multi-estimator approach can provide relatively simple and accurate modeling.

Furthermore, a multi-stage neural network may be employed that produces more accurate results. Neural networks are networks of processors or neurons linked by unidirectional connections that carry data and are weighted accordingly. The neurons act independently and operate based solely on their inputs by associated weighting. Typically, neural networks require training algorithms to adjust the weights on the basis of presented patterns. For example, a training technique that can be applied to a neural network estimator is to simultaneously record the radio link parameters with test speech. The recorded speech is evaluated by a listening panel where it is rated. By way of example, the radio link parameters are processed in the temporal processing stage 32 and correlation processing stage 34 of FIG. 3 where the result plus the ratings are used to train the network. As known to those skilled in the art, an advantage of using a neural network is that processing in stages 32 and 34 may be less complicated since the network may be better suited to this task than ordinary estimators. An example of a neural network that can be used with the present invention is provided in U.S. Pat. No. 5,432,778, the disclosure of which is incorporated herein by reference.

Moreover, depending on system characteristics, such as carrier frequency and frequency hopping, another type of estimator that may be suitable is one based on a finite-state machine that changes state in accordance to some dynamic criteria. For example, the estimator can be configured to change state in response to a change in mobile speed or the change from frequency hopping to non-frequency hopping and vice versa. By way of example, this may be appropriate in situations where the model might be different e.g. for a call with frequency hopping compared to one without frequency hopping.

The present invention contemplates a method of measuring speech quality in a cellular telecommunication system by monitoring the radio link parameters. The foregoing discussion further discloses an inherently simple and accurate speech quality estimation technique that avoids the complexities associated with speech databases and perceptual models. The present invention exploits the use of temporal information of current radio link parameters by calculating new parameters in which relationships and cross-correlations between parameters can be utilized for improved speech quality estimation.

Although the invention has been described in some respects with reference to a specified preferred embodiment, various modifications and applications thereof will become apparent to those skilled in the art. In particular, the inventive concept may be applied, in addition to D-AMPS, to other digitally based systems operating in accordance with, for example, Code Division Multiple Access (CDMA), Global System for Mobile Communication (GSM), or Personal Digital Cellular (PDC). It is therefore the intention that at the following claims not be given a restrictive interpretation but should be viewed to encompass variations and modifications that are derived from the inventive subject matter disclosed.

What is claimed is:

1. A method of estimating the speech quality as perceived by an end user in a radio telecommunication system comprising the steps of:

receiving a radio signal including a plurality of radio link parameters associated with said signal;

processing temporal information from said radio link parameters to calculate a set of temporal parameters;

correlating said radio link parameters with said temporal parameters to produce a set of correlated parameters; and estimating the speech quality from the correlated parameters with an estimator.

2. A method according to claim 1 wherein the radio link parameters include at least one of FER, PER, RxLev, handover statistics, soft information, and speech energy parameters.

3. A method according to claim 2 wherein the step of processing temporal information includes calculating the mean BER over a 0.5 second interval and wherein said correlating step includes applying a third power transformation to said mean BER.

4. A method according to claim 2 wherein the step of processing temporal information includes calculating the mean FER over a 0.5 second interval and wherein said correlating step includes applying a cubed root transformation to said mean FER.

5. A method according to claim 2 wherein the step of processing temporal information includes calculating the mean FER over a 5 second interval and wherein said correlating step includes applying a square root transformation to said mean FER.

6. A method according to claim 2 wherein the estimating step is performed by a state machine estimator, wherein the estimator is configured to change state in response to a change in any one of said radio link parameters.

7. A method according to claim 6 wherein the estimation is performed by a state machine estimator, wherein the estimator is configured to change state in response to a change in mobile speed.

8. A method according to claim 7 wherein the estimator is configured to change state in response to a change from frequency hopping to non-frequency hopping and vice versa.

9. A method according to claim 1 wherein the step of processing temporal information further comprises the step of transforming the parameters in the time domain by performing any one of log, exponential, power operations, rectangular, exponential, or hamming windowing.

10. A method according to claim 1 wherein a time interval length in the range of approximately 0.1 to 10 seconds is used in said temporal information processing step.

11. A method according to claim 1 wherein the estimating step is performed by a linear estimator.

12. A method according to claim 1 wherein the estimating step is performed by a non-linear estimator.

13. A method according to claim 1 wherein the estimating step is performed by a neural network.

14. A method according to claim 1 wherein the estimating step is performed by multiple linear estimators.

15. A system according to claim 16 wherein said temporal parameters have a higher correlation with said speech quality than said radio link parameters.

16. A system for measuring the speech quality as perceived by an end user in a radio telecommunication network comprising:

a temporal processor for extracting temporal information from a set of available radio link parameters associated with a received radio signal, wherein said temporal processor generates a set of temporal parameters relating to speech quality;

a correlation processor for determining the correlation between radio link parameters and temporal parameters to generate a set of correlated parameters; and an estimator for determining an estimate of the speech quality from generated parameters and radio link parameters.

17. A system according to claim 16 wherein the radio link parameters includes at least one of BER, FER, RxLev, handover statistics, soft information, and speech energy parameters.

18. A system according to claim 16 wherein the estimator is comprised of a linear estimator.

19. A system according to claim 16 wherein the estimator is comprised of a non-linear estimator.

20. A system according to claim 16 wherein the estimator is comprised of a neural network.

21. A system according to claim 16 wherein the estimator is comprised of a state machine configured to change state in response to a variable event wherein said variable event is the speed of a moving mobile station.

22. A system according to claim 21 wherein the state machine is configured to change state in response to a change from frequency hopping to non-frequency hopping and vice versa.

23. A system according to claim 16 wherein the estimator is comprised of multiple linear estimators.

24. A method according to claim 1 wherein said temporal parameters have a higher correlation with said speech quality than said radio link parameters.

25. A method for estimating the speech quality in a communications network comprising the steps of:

receiving a set of radio link parameters associated with a received radio signal;

temporally processing said radio link parameters to generate a set of temporal parameters, wherein said temporal parameters have a higher correlation with said speech quality than said radio link parameters;

correlating said temporal parameters and said radio link parameters to generate a set of correlated parameters; and estimating said speech quality from the correlated parameters with an estimator.

* * * * *